United States Patent
Mejdrich et al.

(10) Patent No.: US 8,587,594 B2
(45) Date of Patent: Nov. 19, 2013

(54) ALLOCATING RESOURCES BASED ON A PERFORMANCE STATISTIC

(75) Inventors: Eric O. Mejdrich, Mantorville, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/784,522

(22) Filed: May 21, 2010

(65) Prior Publication Data

US 2011/0285709 A1    Nov. 24, 2011

(51) Int. Cl.
G06F 15/16    (2006.01)

(52) U.S. Cl.
USPC .......................................... 345/502; 345/426

(58) Field of Classification Search
None
See application file for complete search history.

(56) References Cited

U.S. PATENT DOCUMENTS

| | | | | |
|---|---|---|---|---|
| 7,385,607 | B2* | 6/2008 | Bastos et al. | 345/502 |
| 7,973,804 | B2* | 7/2011 | Mejdrich et al. | 345/614 |
| 7,978,205 | B1* | 7/2011 | Patel et al. | 345/619 |
| 2003/0169269 | A1* | 9/2003 | Sasaki et al. | 345/581 |
| 2006/0010449 | A1* | 1/2006 | Flower et al. | 718/102 |
| 2007/0091089 | A1* | 4/2007 | Jiao et al. | 345/426 |
| 2008/0094410 | A1* | 4/2008 | Jiao et al. | 345/592 |
| 2008/0192063 | A1* | 8/2008 | Liao et al. | 345/582 |
| 2009/0231349 | A1* | 9/2009 | Mejdrich et al. | 345/506 |
| 2011/0018884 | A1* | 1/2011 | Ritts et al. | 345/522 |
| 2011/0090225 | A1* | 4/2011 | Twilleager | 345/427 |

* cited by examiner

*Primary Examiner* — Kee M Tung
*Assistant Examiner* — Ryan D McCulley
(74) *Attorney, Agent, or Firm* — Toler Law Group

(57) ABSTRACT

A method includes rendering an object of a three dimensional image via a pixel shader based on a render context data structure associated with the object. The method includes measuring a performance statistic associated with rendering the object. The method also includes storing the performance statistic in the render context data structure associated with the object. The performance statistic is accessible to a host interface processor to determine whether to allocate a second pixel shader to render the object in a subsequent three-dimensional image.

18 Claims, 5 Drawing Sheets

ALLOCATING RESOURCES BASED ON A PERFORMANCE STATISTIC

FIELD OF THE DISCLOSURE

The present disclosure relates generally to image processing, and more specifically to allocating resources based on a performance statistic.

BACKGROUND

Graphics processing units typically use dedicated hardware elements to perform specific functions, such as breaking an object in an image into primitives. However, when dedicated hardware elements are used to perform specific functions, the hardware elements may not be reassignable to perform different tasks.

SUMMARY OF THE DISCLOSURE

In a particular embodiment, a method includes rendering an object of a three dimensional image via a pixel shader based on a render context data structure associated with the object. The method includes measuring a performance statistic associated with rendering the object. The method also includes storing the performance statistic in the render context data structure associated with the object. The performance statistic is accessible to a host interface processor to determine whether to allocate a second pixel shader to render the object in a subsequent three-dimensional image.

In another particular embodiment, a computer program product includes a non-transitory computer usable medium having computer usable program code embodied therewith. The computer usable program code is executable by a processor to retrieve, at a host interface processor, a performance statistic associated with rendering an object in a three dimensional image. The performance statistic is measured by a pixel shader that rendered the object. The computer usable program code is executable by the processor to determine whether the performance statistic satisfies a threshold. The computer usable program code is further executable by the processor to assign a second pixel shader to render the object when the performance statistic satisfies the threshold.

In another particular embodiment, a computer graphics system includes a plurality of pixel shader elements. Each pixel shader element of the plurality of pixel shader elements is configured to render an object based on a render context data structure associated with the object. Each pixel shader element of the plurality of pixel shader elements is further configured to measure a performance statistic associated with rendering the object and to store the performance statistic in the render context data structure associated with the object.

DETAILED DESCRIPTION

Figure 1:
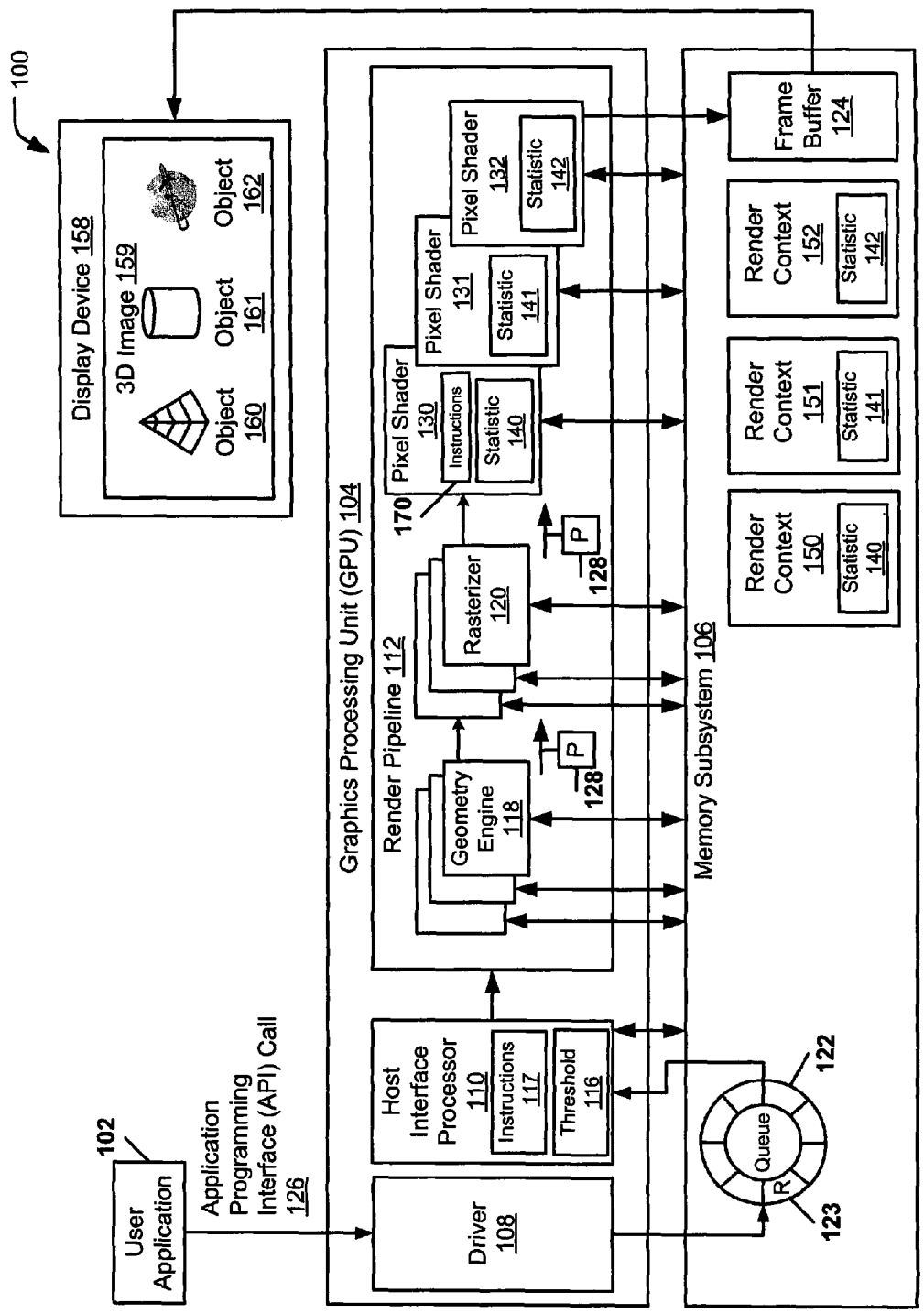
FIG. 1 is a block diagram of a first system to render a three-dimensional image.

Referring to FIG. 1, a first block diagram of a system to render a three-dimensional image is depicted and generally designated 100. Rendering is a process of generating an image from a model (e.g., a data structure) that represents the image using a computer program having processor executable instructions. The system 100 includes a user application 102 that accesses a graphics processing unit 104 using an application programming interface (API) 126. The graphics processing unit 104 is communicatively coupled to a memory subsystem 106. The memory subsystem 106 is coupled to a display device 158.

The graphics processing unit 104 is operable to render a three-dimensional image 159 at the display device 158 based on a request 123 from the user application 102. The request 123 may be received from the user application 102 via API calls, such as the API call 126. The graphics processing unit 104 includes a driver 108, a host interface processor 110, and a render pipeline 112. The user application 102 may use the API call 126 to the driver 108 to initiate generation of three-dimensional images, such as the three-dimensional image 159, for display at the display device 158. In response to the API call 126, the driver 108 may place a request at the queue 122 for the host interface processor 110.

The memory subsystem 106 includes a queue 122 and a frame buffer 124. The queue 122 may be used to queue up API calls received from the user application 102. The frame buffer 124 may be used to buffer frames of three-dimensional images generated by the graphics processing unit 104 for display at the display device 158.

The render pipeline 112 includes multiple programmable processing elements that may be assigned different tasks by the host interface processor 110. For example, in FIG. 1, a geometry engine 118 has three elements, a rasterizer 120 has three elements, and a pixel shader has three pixel shader elements 130, 131, and 132. Each of the geometry engine elements 118, the rastererizer elements 120, and the pixel shader elements 130-132 may be hardware processing elements capable of being assigned to perform different functions. The host interface processor 110 may dynamically (i.e., in real-time) change the allocation of the number of processing elements performing a particular function. For example, the host interface processor 110 may take one of the geometry engine elements 118 and reassign it as one of the pixel shader elements 130-132 or as one of the rasterizer elements 120 based on a workload associated with each processing element. For example, the host interface processor 110 may change the allocation of the number of processing elements performing a particular function based on performance measurements associated with rendering a particular object.

In a particular embodiment, the host interface processor 110 may assign one of the processing elements 118, 120, and 130-132 a particular function by sending the processing element microcode to execute to perform the particular function. In another particular embodiment, the host interface processor 110 may assign one of the processing elements 118, 120, and 130-132 a particular function by sending a pointer to microcode stored at the memory subsystem 106. In yet another particular embodiment, the host interface processor 110 may assign one of the processing elements 118, 120, and 130-132 a particular function by selecting a pre-programmed function of the processing element. For example, each processing element may be pre-programmed to perform several functions (e.g., geometry engine, rasterizer, and pixel shader) and the host interface processor 110 may select from among the pre-programmed functions. In a particular embodiment, the processing elements 118, 120, and 130-132 may be programmable elements of a network on a chip.

The host interface processor 110 may execute instructions 117 (e.g., firmware or microcode) to perform various functions. The processing elements 118, 120, and 130-132 may execute instructions to perform various functions. For example, the pixel shader element 130 may perform a pixel shader function by executing instructions 170. The instructions 117 and 170 may be stored at a non-transitory computer readable medium, such as an on-chip memory (not shown) of the graphics processing unit 104.

The graphic processing unit 104 may periodically render a frame, i.e., the three-dimensional image 159, for display at the display device 158. For example, the graphics processing unit 104 may generate thirty or more frames per second. When a particular object of the three-dimensional image 159 is complex and requires additional resources to render the particular object (e.g., when the object was not completely rendered within one thirtieth of a second in a particular frame), the host interface processor 110 may allocate or reassign resources to render the particular object before the next frame is rendered.

In operation, the user application 102 may make an API call 126 to the driver 108 to place a request 123 in the queue 122. The request 123 may be to render a portion of the three-dimensional image 159 at the display device 158. The host interface processor 110 may retrieve the request 123 from the queue 122 and instruct the render pipeline 112 to render a portion of the three-dimensional image 159 at the display device 158. The three-dimensional image 159 may include objects 160, 161, and 162.

The geometry engine elements 118 may break one of the objects 160-162 of the three-dimensional image 159 into primitives and send a primitive 128 to one of the rasterizer elements 120. The primitive 128 may be a geometric primitive, such as a triangle, a rectangle, a cube, or a cylinder, used to render the three-dimensional image 159. The rasterizer elements 120 may receive the primitive 128 from the geometry engine elements 118. The rasterizer elements 120 may scan a two-dimensional area (i.e., a two-dimensional area that is mapped to the display device 158) to determine whether to draw a pixel at a particular location in the two-dimensional area based on properties of the primitive 128. The rasterizer elements 120 may send the primitive 128 to one of the pixel shader elements 130-132.

The pixel shader elements 130-132 may execute instructions to perform various functions. One of the pixel shader elements 130-132 may receive the primitive 128 and render a portion of one of the objects 160-162 based on a render context associated with the object. The render context associated with an object includes information on how to convert a geometric primitive into individual pixels for display at a display device. For example, the pixel shader element 130 may render the object 160 based on the render context 150, the pixel shader element 131 may render the object 161 based on the render context 151, and the pixel shader element 152 may render the object 162 based on the render context 152. To illustrate, the rendering context 150 may be used by the pixel shader element 130 to convert the primitive 128 into individual pixels for display at the display device 158.

The pixel shader elements 130-132 may measure at least one performance statistic associated with rendering the objects 160-162 and store the performance statistic in the render context associated with the object. For example, when the pixel shader element 130 renders the object 160, the pixel shader element 130 may measure a performance statistic 140 associated with rendering the object 160 and store the performance statistic 140 in the render context 150. The pixel shader element 131 may measure the performance statistic 141 when rendering the object 161 and store the performance statistic 141 in the render context 151. The pixel shader element 132 may measure the performance statistic 142 associated with rendering the object 162 and store the performance statistic 142 in the render context 152. The performance statistics 140-142 may include one or more of a number of elapsed clock cycles to render an object in a previous frame, a number of instructions executed to render an object in the previous frame, a cache hit rate associated with rendering an object in the previous frame, a ratio of floating point instructions executed to integer point instructions executed to render an object in the previous frame, another performance statistic related to rendering an object in the previous frame, or any combination thereof.

The host interface processor 110 may use the performance statistics 140-142 that are stored in the render context 150-152 to determine whether to assign or reassign the processing elements to different functions. For example, when one of the performance statistics 140-142 associated with rendering an object in a previous frame satisfies the threshold 116, the host interface processor 110 may allocate additional resources, such as additional processing elements, to render the object in a subsequent frame. To illustrate, after the host interface processor 110 determines that a number of instructions executed by the pixel shader element 132 to render the object 162 in a first frame satisfies the threshold 116, the host interface processor 110 may reassign one of the rasterizer elements 120 as a pixel shader element before the object 162 is rendered in a subsequent frame. To illustrate, when the number of instructions executed by the pixel shader element 132 to render the object 162 in a previous frame are greater than the threshold 116, the host interface processor 110 may assign an additional resource (e.g., an additional processing element) to render the object 162 in a subsequent frame. For example, the host interface processor 110 may delineate two portions (e.g., a top half and a bottom half) of the object 162 and assign the pixel shader element 132 to render a first portion (e.g., the top half) of the object 162 and assign one of the reassigned rasterizer elements 120 to render a second portion (e.g., the bottom half) of the object 162.

The host interface processor 110 may modify one of the render contexts 150-152 to identify the allocated additional resources before a subsequent frame is rendered. For example, the pixel shader elements 130-131 may render relatively simple objects, such as the objects 160-161 while the pixel shader element 132 may render a more complex object, such as the object 162. The host interface processor 110 may use the statistics 140-142 to determine which of the objects 160-162 are more complex and require more resources. For example, the host interface processor 110 may determine that the pixel shader element 132 has a workload that is greater than the workload of the pixel shader elements 130-131 based on the statistics 140-142. In response, the host interface processor 110 may allocate an additional processing element, such as one of the three geometry engine elements 118 or one of the three rasterizer elements 120 as an additional (i.e. a fourth) pixel shader element. For example, the host interface processor 110 may delineate two portions of the object 162 and assign the top half of the object 162 to the pixel shader element 130 and assign the bottom half of the object 162 to the additional pixel shader element in order to reduce the time to render the object 162.

While a raster-based graphics system is depicted in FIG. 1, performance statistics associated with rendering objects may be used by other types of graphics systems, such as ray tracing systems, to dynamically assign/reassign resources, such as additional processing elements, and to distribute workload to the additional resources.

The pixel shader elements 130-132 may store the performance statistics 140-142 associated with rendering the objects 160-162 in a previous frame in the render contexts 150-152. The host interface processor 110 may use the statistics 140-142 to allocate additional resources (e.g., additional processing elements) before the objects 160-162 are rendered in a subsequent frame. The host interface processor 110 may redistribute the rendering of one or more of the objects 160-162 in the subsequent frame to the additional resources based on the statistics 140-142. Thus, by measuring performance statistics associated with rendering objects in a first frame, objects that are more complex to render may be provided with an appropriate amount of resources, such as processing elements, to render the complex objects in subsequent frames. For example, the host interface processor may reassign the processing elements to enable the workload of the graphics processing unit 104 to be distributed across the processing elements.

Figure 2:
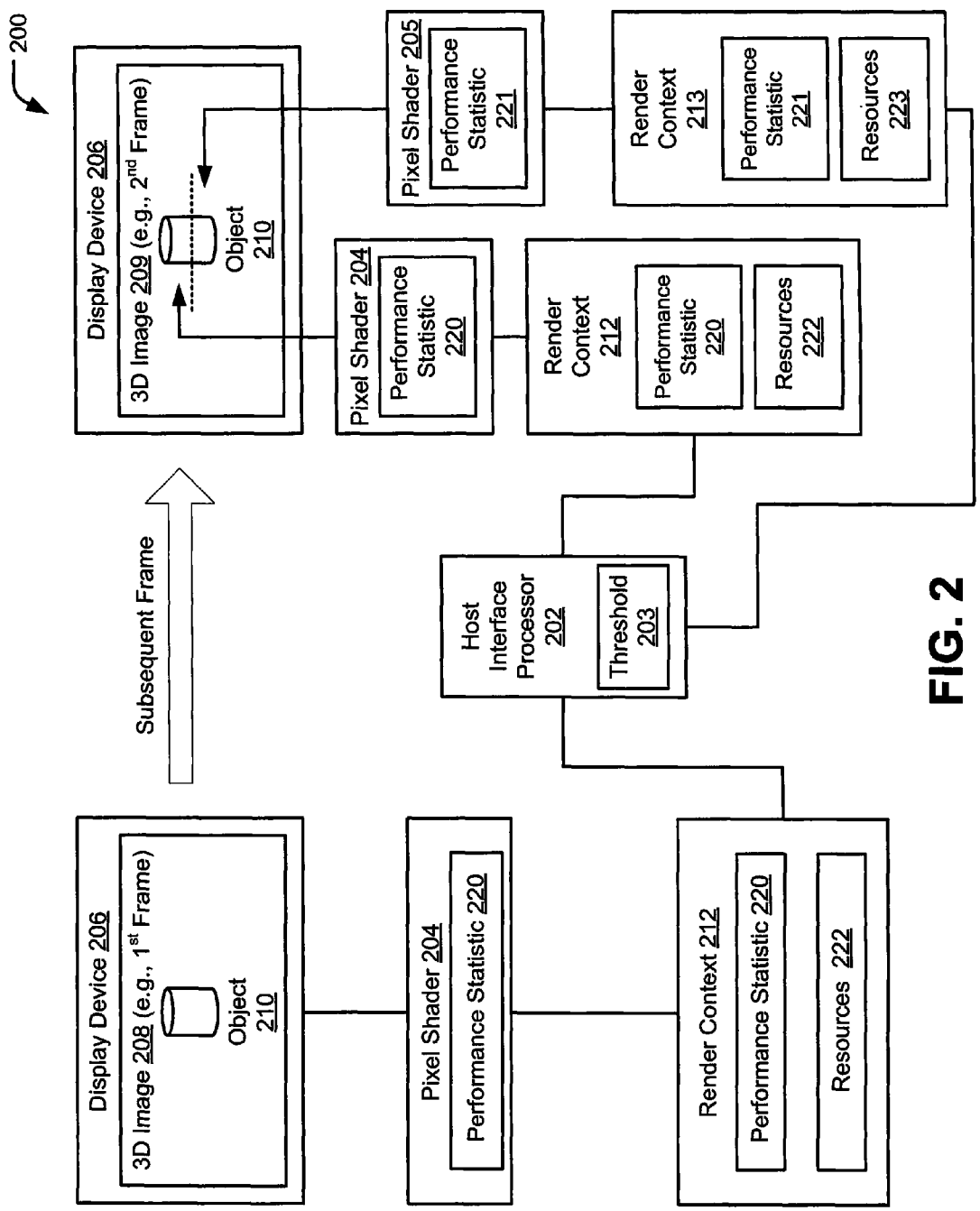
FIG. 2 is a block diagram of a second system to render a three-dimensional image.

Referring to FIG. 2, a second block diagram of a system to render a three-dimensional image is depicted and generally designated 200. The system 200 includes a host interface processor 202, a pixel shader element 204, and a display device 206.

The pixel shader element 204 may be a hardware-based processing element that can be assigned to perform more than one function by the host interface processor 202. The pixel shader element 204 may render a portion of an object 210 in a three-dimensional image 208 (e.g., a first frame of a video game) at the display device 206. The pixel shader element 204 may render the portion of the object 210 based on a render context 212. The render context associated with the object 210 may include information associated with converting a geometric primitive into individual pixels for display at the display device 206.

When a performance statistic 220 indicates that a workload of the pixel shader element 204 satisfies a threshold 203, the host interface processor 202 may assign an additional resource, such as an additional processing element, to render the object 210 in a subsequent frame. For example, the host interface processor 202 may assign a pixel shader element 205 to assist the pixel shader element 204 to render the object 210 in a three-dimensional image 209 (e.g., a subsequent frame).

The display device 206 may display frames generated by a graphic processing unit that includes the pixel shader element 204. For example, each frame displayed by the display device 206 may be in the form of a three-dimensional image, such as the three-dimensional image 208. In a particular embodiment, the display device 206 may display thirty of more frames every second. To illustrate, the display device 206 may display the three-dimensional image 208 (e.g., a first frame) and subsequently display the three-dimensional image 209 (e.g., a second or subsequent frame) after displaying the three-dimensional image 208.

In operation, the pixel shader element 204 may render the object 210 in the three-dimensional image 208 at the display device 206. The pixel shader element 204 may measure at least one performance statistic 220 associated with rendering the object 210 in the three-dimensional image 208 and store the at least one performance statistic 220 at a render context 212. For example, the pixel shader element 204 may store the performance statistic 220 at the render context 212 after the three-dimensional image 208 has been rendered but before the three-dimensional image 209 has been rendered.

Before the three-dimensional image 209 is rendered, the host interface processor 202 may determine that the performance statistic 220 satisfies the threshold 203. The host interface processor 202 may assign another processing element, such as the pixel shader element 205, to render a portion of the object 210 for the second frame. For example, the host interface processor 202 may determine that a number of clock cycles used by the pixel shader element 204 satisfies the threshold 203. In response, the host interface processor 202 may assign the pixel shader element 205 to assist the pixel shader element 204 to render the object 210 in a subsequent frame (e.g., the three-dimensional image 209). For example, the host interface processor 202 may delineate two portions of the object 210 and assign the pixel shader element 204 to render a first portion (e.g., a top half) of the object 210 and assign the pixel shader element 205 to render a second portion (e.g., a bottom half) of the object 210 in the three-dimensional image 209 and in at least one subsequent frame that includes the object 210. The host interface processor 202 may indicate that an additional resource (i.e., the pixel shader element 205) has been assigned to render a portion of the object 210 by modifying a resources 222 field of the render context 212.

The host interface processor 202 may create a render context 213 associated with rendering the second portion of the object 210. The pixel shader element 205 may measure at least one performance statistic 221 associated with rendering the second portion of the object 210 in the three-dimensional image 209 and store the performance statistic 221 in the render context 213. The host interface processor 202 may determine, based on the performance statistics 220-221, whether to allocate an additional resource (e.g., a third processing element) to assist the pixel shader elements 204-205 in rendering the object 210 for a subsequent frame (not shown).

The host interface processor 202 may determine, based on the performance statistics 221, to reallocate the pixel shader element 205 to render a second object (not shown). For example, in a video game, the object 210 may depict a sinking boat. As the boat sinks, only the top half of the object 210 may remain visible in a third frame (not shown). The host interface processor 202 may determine, based on the performance statistics 221, to reallocate the pixel shader element 205 to render a second object before a third frame (not shown) is rendered.

Thus, the host interface processor 202 may use the performance statistic 220 associated with rendering the object 210 in a first frame to determine whether to allocate additional resources to render the object 210 in a subsequent frame or to reassign resources currently allocated to render the object 210. By doing so, the host interface processor 202 can balance workloads for multiple processing elements, such as the pixel shader elements 204-205. Balancing workloads for multiple processing elements may enable an appropriate amount of resources to be allocated to render each object displayed in a frame.

Figure 3:
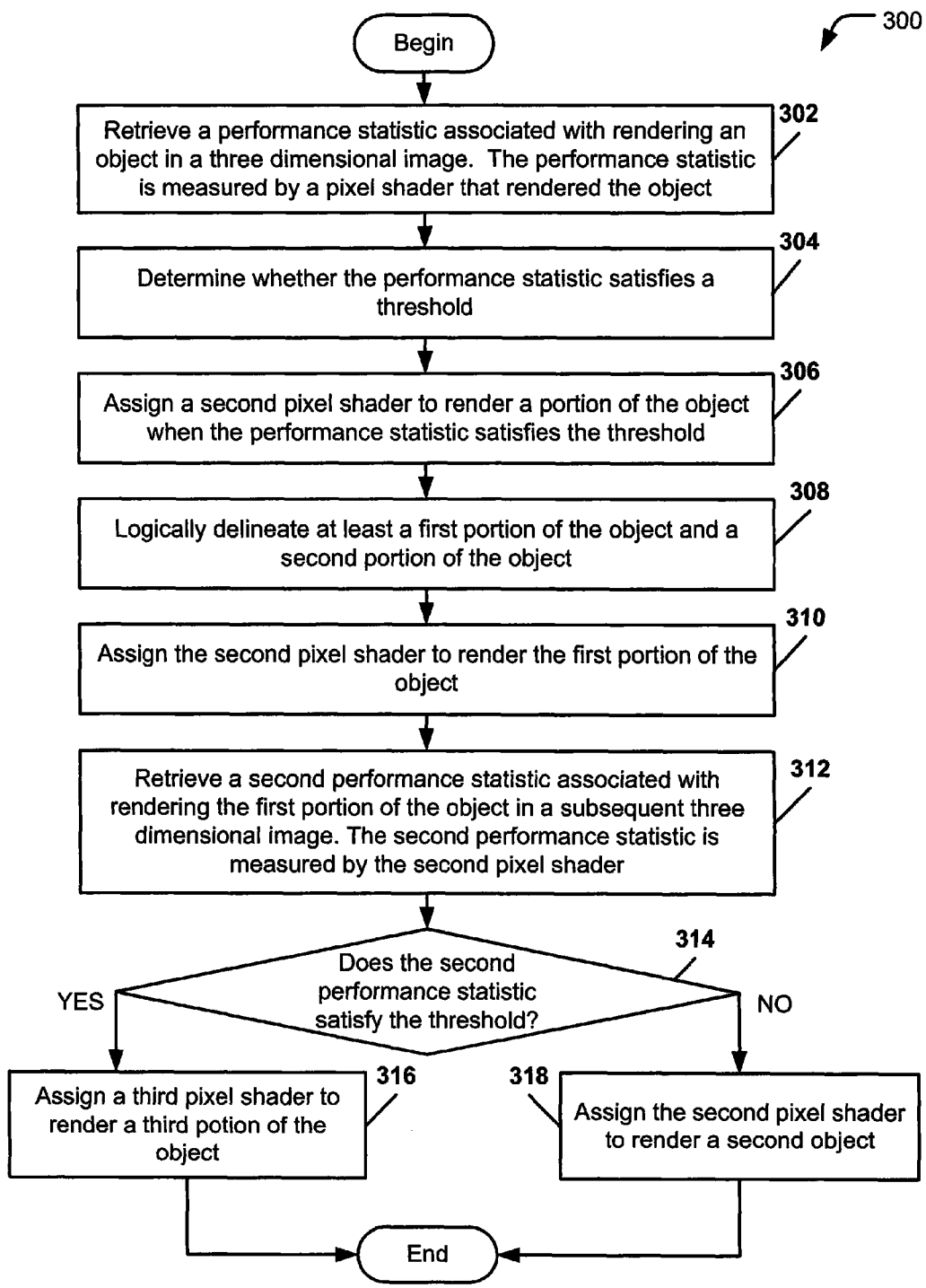
FIG. 3 is a first flow diagram of a method of rendering a three-dimensional image.

Referring to FIG. 3, a first flow diagram of a particular embodiment of a method to render a graphics image is depicted and generally designated 300. The method may be performed by a host interface processor, such as the host interface processor 110 of FIG. 1.

The method begins at 302, when a host interface processor retrieves a performance statistic associated with rendering an object in a three dimensional image. The performance statistic may be measured by a pixel shader element that rendered the object. For example, in FIG. 2, the host interface processor 202 may retrieve the performance statistic 220 from the render context 212 after the three-dimensional image 208 (e.g., a first frame) has been rendered.

Moving to 304, the host interface processor may determine whether the performance statistic satisfies a threshold. Proceeding to 306, the host interface processor may assign a second pixel shader element to render a portion of the object when the performance statistic satisfies the threshold. For example, the second pixel shader element may be used to speed up rendering of the object in a subsequent frame. Advancing to 308, the host interface processor may logically delineate at least a first portion of the object and a second portion of the object. Continuing to 310, the host interface processor may assign the second pixel shader element to render the first portion of the object. For example, in FIG. 2, the host interface processor 202 may assign the pixel shader element 205 to render a portion of the object 210 when the performance statistic 220 satisfies the threshold 203. The host interface processor 202 may delineate a top half and a bottom half of the object 210. The host interface processor 202 may assign the pixel shader element 204 to render the top half of the object 210 and may assign the pixel shader element 205 to render the bottom half of the object 210.

Moving to 312, the host interface processor may retrieve a second performance statistic associated with rendering the first portion of the object in a subsequent three dimensional image. The second performance statistic may be measured by the second pixel shader element. Advancing to 314, the host interface processor may determine whether the second performance statistic satisfies the threshold. When the second performance statistic satisfies the threshold, the method proceeds to 316, where a third pixel shader element may be assigned to render a third portion of the object. When the second performance statistic does not satisfy the threshold, the method proceeds to 318, where the second pixel shader element may be assigned to render a second object. For example, in FIG. 2, the pixel shader 205 may measure the performance statistic 221 after rendering the bottom half of the object 210. When the performance statistic 221 satisfies the threshold 203, the host interface processor 202 may allocate another processing element as a third pixel shader (not shown). The host interface processor 202 may delineate a third portion of the object 210 and assign the third pixel shader element to render the third portion of the object 210. When the performance statistic 221 does not satisfy the threshold 203, the host interface processor 202 may assign the second pixel shader element to perform another function, such as render a second object.

Thus, a host interface processor may use the performance statistic to selectively allocate additional resources, such as additional processing elements, for rendering a particular object. The host interface processor may dynamically redistribute certain tasks related to rendering the particular object to the additional resources. By doing so, workloads for rendering objects may be distributed across multiple processing elements. For example, a workload for rendering a complex object may be distributed across two or more processing elements. The host interface processor may continually monitor the performance statistics associated with rendering objects and dynamically assigns processing elements to perform various functions (e.g., a geometry engine function, a rasterizer function, and a pixel shader function) based on the performance statistics.

After a particular frame is rendered and before a subsequent frame is rendered, the host interface processor may dynamically assign/reassign processing elements to perform various functions based on the performance statistics. Thus, as the monitored performance statistics change, the host interface processor may reassign processing elements to perform different functions. For example, the host interface processor may assign two pixel shader elements to render an object. The host interface processor may monitor the performance statistics of the two pixel shader elements after each frame is rendered. When the complexity of the object increases after a frame is rendered (e.g., the object is increasing in size and additional details of the surface of the object are displayed), the host interface processor may assign a third pixel shader element to assist in rendering the object for a subsequent frame. When the complexity of the object decreases after a frame is rendered (e.g., the object is decreasing in size and fewer details are displayed), the host interface processor may reassign one of the two pixel shader elements to another object or to another function.

Figure 4:
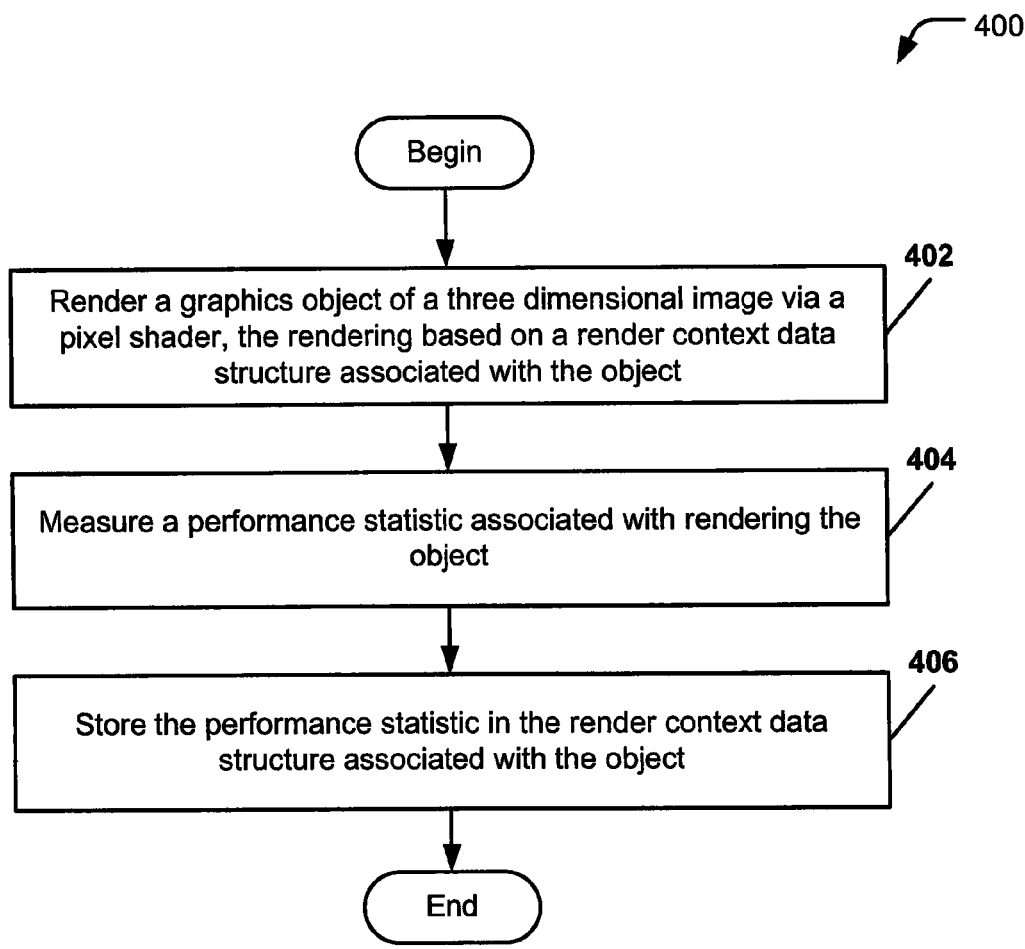
FIG. 4 is a second flow diagram of a method of rendering a three-dimensional image.

Referring to FIG. 4, a second flow diagram for rending a graphics image is depicted and generally designated 400. The method may be performed by a pixel shader element, such as one of the pixel shader elements 130-132 of FIG. 1.

A graphics object of a three dimensional image is rendered, at 402. The rendering may be based on a render context data structure associated with the object to be rendered. Moving to 404, a performance statistic associated with rendering the object may be measured. Advancing to 406, the performance statistic is stored in the render context data structure associated with the object and the method ends. For example, in FIG. 1, the pixel shader element 130 may measure the statistic 140 when rendering the object 160 and store the statistic 140 in the render context 150.

Thus, pixel shader elements may store performance statistics associated with rendering objects at render contexts that are associated with the objects. A host interface processor may use the performance statistics to selectively allocate additional resources, such as additional elements, for rendering a particular object. The host interface processor may redistribute certain tasks related to the rendering of the particular object to the additional resources based on the performance statistics.

Figure 5:
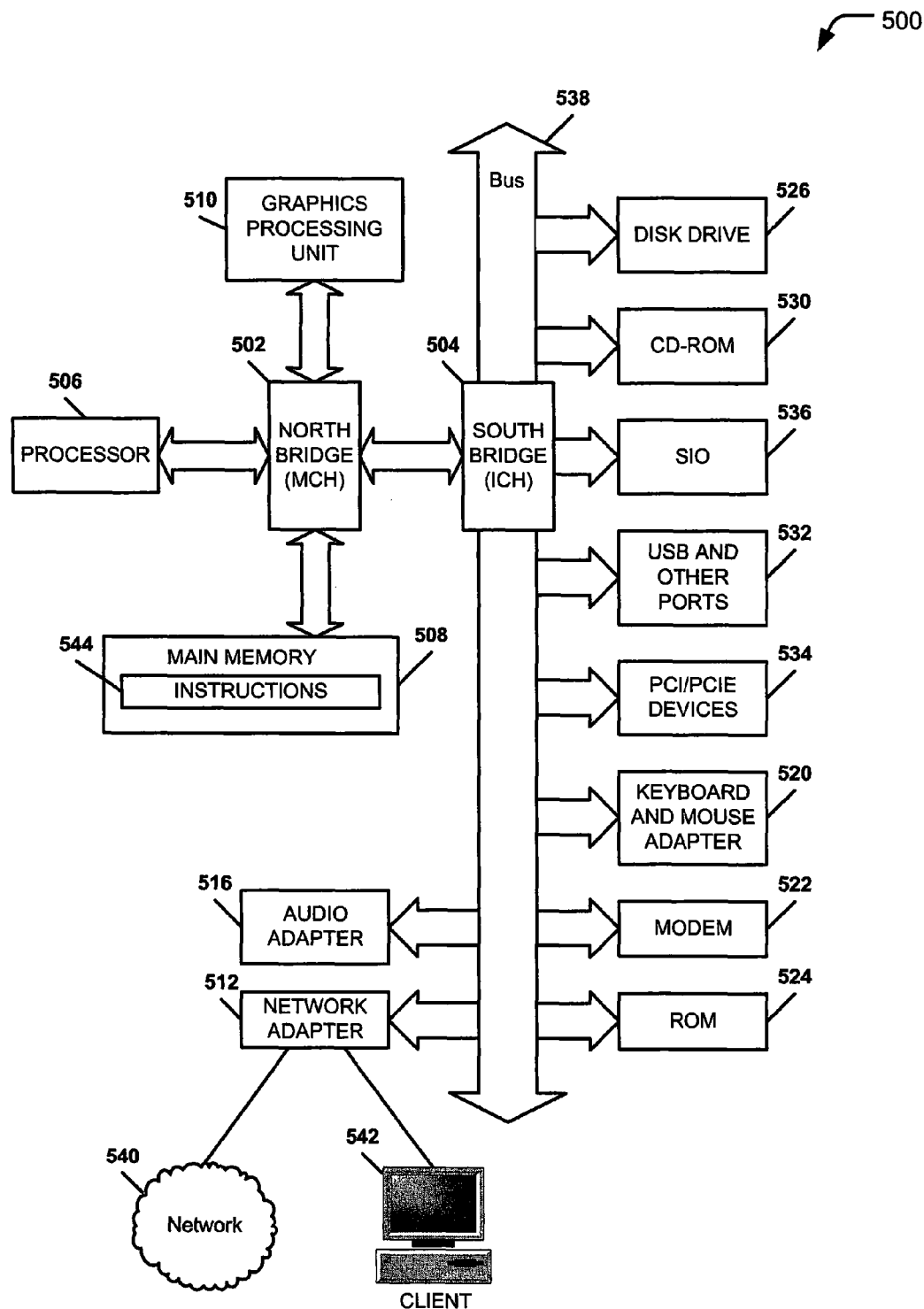
FIG. 5 is a general diagram of a computing system.

FIG. 5 is a block diagram of a computing system in which systems and methods of the present disclosure may be implemented. Computing system 500 includes an example of a graphics processing unit 510, such as the graphics processing unit 104 of FIG. 1.

In the depicted example, the computing system 500 employs a hub architecture including a north bridge and a memory controller hub (MCH) 502 and a south bridge and input/output (I/O) controller hub (ICH) 504. A processor 506, a main memory 508, and the graphics processing unit 510 are coupled to the north bridge and memory controller hub 502. For example, the graphics processing unit 510 may be coupled to the MCH 502 through an accelerated graphics port (AGP) (not shown).

In the depicted example, a network adapter 512 is coupled to the south bridge and I/O controller hub 504 and an audio adapter 516, a keyboard and mouse adapter 520, a modem 522, a read only memory (ROM) 524, universal serial bus (USB) ports and other communications ports 532, and Peripheral Component Interconnect (PCI) and Peripheral Component Interconnect Express (PCIe) devices 534 are coupled to the south bridge and I/O controller hub 504 via bus 538. A disk drive 526 and a CD-ROM drive 530 are coupled to the south bridge and I/O controller hub 504 through the bus 538. The PCI/PCIe devices 534 may include, for example, Ethernet adapters, add-in cards, and PC cards for notebook computers. The ROM 524 may be, for example, a flash binary input/output system (BIOS). The disk drive 526 and the CD-ROM drive 530 may use, for example, an integrated drive electronics (IDE) or serial advanced technology attachment (SATA) interface. A super I/O (SIO) device 536 may be coupled to the south bridge and I/O controller hub 504.

The main memory 508 includes computer instructions 544 on a computer readable medium. The computer instructions 544 are executable by the processor 506 or the graphic processing unit 510 to perform various functions.

An operating system (not shown) runs on the processor 506 and coordinates and provides control of various components within the computing system 500. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 500 (Java and all Java-based trademarks are trademarks of Sun Microsystems, Inc. in the United States, other countries, or both).

Instructions for the operating system, the object-oriented programming system, and applications or programs are located on storage devices, such as the disk drive 526, and may be loaded into the main memory 508 for execution by the processor 506. The processes of the disclosed illustrative embodiments may be performed by the processor 506 using computer implemented instructions, which may be located in a non-transitory memory such as, for example, the main memory 508, the read only memory 524, or in one or more of the peripheral devices.

The hardware in computing system 500 may vary depending on the implementation. Other internal hardware or peripheral devices, such as flash memory, equivalent non-volatile memory, or optical disk drives and the like, may be used in addition to or in place of the hardware depicted in FIG. 5. Also, the processes of the disclosed illustrative embodiments may be applied to a multiprocessor data processing system.

In some illustrative examples, portions of the computing system 500 may be implemented in a personal digital assistant (PDA), which is generally configured with flash memory to provide non-volatile memory for storing operating system files and/or user-generated data. A bus system may include one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 508 or a cache such as found in the north bridge and memory controller hub 502. A processing unit may include one or more processors or CPUs, such as the processor 506 or the graphics processing unit 510. The depicted examples in FIG. 5 and above-described examples are not meant to imply architectural limitations. For example, portions of the computing system 500 also may be implemented in a personal computer, server, server cluster, tablet computer, laptop computer, or telephone device in addition to taking the form of a PDA.

Particular embodiments of the computing system 500 can take the form of an entirely hardware embodiment or an embodiment containing both hardware and software elements. In a particular embodiment, the disclosed methods are implemented in software that is embedded in processor readable non-transitory medium and executed by a processor, which includes but is not limited to firmware, resident software, microcode, etc.

Further, embodiments of the present disclosure, such as the one or more embodiments in FIGS. 1-5 can take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method, comprising:
   using a host interface processor to assign a first pixel shader to an object of a three dimensional image based on a render context data structure of the object;
   rendering the object in a first frame using the first pixel shader;
   measuring a performance statistic associated with rendering the object in the first frame, wherein the performance statistic is measured by the first pixel shader;
   storing the performance statistic in the render context data structure of the object,
   wherein the performance statistic is retrieved from the render context structure of the object to determine whether to allocate a second pixel shader to render the object in a subsequent three-dimensional image of a second frame that consecutively follows the first frame; and
   assigning the second pixel shader to the object while maintaining the assignment of the first pixel shader during the second frame, wherein assigning the second pixel shader comprises reassigning a processing element from performing a rasterizer function to performing a pixel shader function.

2. The method of claim 1, wherein the performance statistic includes at least one of a number of elapsed clock cycles to render the object or a cache hit rate associated with rendering the object.

3. The method of claim 1, wherein the performance statistic includes a ratio of floating point instructions executed to render the object as compared to integer point instructions executed to render the object.

4. The method of claim 1, wherein the performance statistic is retrieved from the render context structure of the object by a host interface processor, the host interface processor configured to allocate the second pixel shader to render the object when the performance statistic satisfies a threshold.

5. The method of claim 1, wherein the render context data structure is stored in memory external to a graphics processing unit.

6. A computer program product comprising a non-transitory computer usable medium having computer usable program code embodied therewith, the computer usable program code executable by a processor to:
use a host interface processor to assign a first pixel shader to an object of a three dimensional image based on a render context data structure of the object, rendering the object in a first frame using the first pixel shader, retrieve a performance statistic associated with rendering the object in the first frame, wherein the performance statistic is measured by the first pixel shader that rendered the object, and wherein the performance statistic is retrieved from the render context structure of the object to determine whether to assign a second pixel shader to render a portion of the object in a subsequent three-dimensional image of a second frame that consecutively follows the first frame;
determine whether the performance statistic satisfies a threshold;
when the performance statistic satisfies the threshold, assign the second pixel shader to render the portion of the object, wherein assigning the second pixel shader to render the object comprises reassigning a processing element from performing a rasterizer function to performing a pixel shader function; and
during a second frame, assigning a third pixel shader to the object while maintaining the assignment of the first pixel shader and the second pixel shader.

7. The computer program product of claim 6, wherein the computer usable program code is further executable by the processor to logically delineate at least a first portion of the object and a second portion of the object.

8. The computer program product of claim 7, wherein the computer usable program code is further executable by the processor to assign the second pixel shader to render the first portion of the object.

9. The computer program product of claim 8, wherein the computer usable program code is further executable by the processor to:
retrieve a second performance statistic associated with rendering the first portion of the object in a subsequent three dimensional image, the second performance statistic measured by the second pixel shader;
determine whether the second performance statistic satisfies the threshold; and
when the second performance statistic satisfies the threshold, assign a third pixel shader to render a third portion of the object.

10. The computer program product of claim 9, wherein the computer usable program code is further executable by the processor to assign the second pixel shader to render a second object when the second performance statistic does not satisfy the threshold.

11. A computer graphics system, comprising:
a plurality of pixel shader processing elements, each pixel shader processing element of the plurality of pixel shader processing elements to render at least a portion of an object based on a render context data structure of the object, wherein the render context data structure includes information regarding conversion of a geometric primitive of the object into pixels for display at a display device, to measure a performance statistic associated with rendering the object, and to store the performance statistic in the render context data structure of the object; and
a host interface processor to retrieve the performance statistic that is stored in the render context data structure of the object, wherein the performance statistic is retrieved from the render context structure of the object to determine whether to allocate a second pixel shader processing element to render the object in a subsequent three-dimensional image of a second frame that consecutively follows the first frame, and to assign a first shader processing element of the plurality of pixel shader processing elements to the object, wherein the performance statistic is measured by the first pixel shader processing element, to assign the second shader processing element of the plurality of pixel shader processing elements to the object while maintaining the assignment of the first pixel shader during the second frame, wherein assigning the second pixel shader processing element to render the object comprises reassigning a processing element from performing a rasterizer function to performing a pixel shader function, and wherein the second shader processing element remains assigned to the object, and to render the object in the second frame using the first shader processing element and the second shader processer element.

12. The computer graphics system of claim 11, wherein the host interface processor is further configured to examine the performance statistic that is stored in the render context data structure of the object, wherein examining the performance statistic includes retrieving the performance statistic from the render context structure of the object to determine whether to allocate a third pixel shader processing element to render the object, to determine whether the performance statistic satisfies a threshold, to allocate the third pixel shader processing element to render the object when the performance statistic satisfies the threshold, and to modify the render context data structure to identify the third pixel shader processing element.

13. The computer graphics system of claim 12, wherein the host interface processor allocates the third pixel shader processing element to render a second portion of the object by logically delineating at least two portions of the object and assigning the third pixel shader processing element to render the second portion of the object.

14. The computer graphics system of claim 13, wherein assigning the third pixel shader processing element comprises reassigning a processing element from performing a rasterizer function to performing a pixel shader function.

15. The computer graphics system of claim 13, wherein assigning the third pixel shader processing element comprises reassigning a processing element from performing a geometry engine function to performing a pixel shader function.

16. The computer graphics system of claim 11, further comprising:
   a geometry engine to break the object into primitives and to send at least one of the primitives to a rasterizer processing element.

17. The computer graphics system of claim 16, wherein the rasterizer processing element is configured to receive the at least one primitive from the geometry engine, to scan a two-dimensional area to determine whether to draw a pixel at a particular location in the two-dimensional area based on properties of the at least one primitive, and to send the at least one primitive to a particular pixel shader processing element of the plurality of pixel shader processing elements.

18. The computer graphics system of claim 11, wherein the performance statistic is at least one of a number of elapsed clock cycles to render the object, a number of instructions executed to render the object, a cache hit rate associated with rendering the object, or a ratio of floating point instructions executed to render the object as compared to integer point instructions executed to render the object.

* * * * *